(12) United States Patent
Mirabile

(10) Patent No.: US 6,950,122 B1
(45) Date of Patent: Sep. 27, 2005

(54) INTEGRATED VIDEO DATA CAPTURE SYSTEM

(75) Inventor: John Mirabile, Elkridge, MD (US)

(73) Assignee: Link Communications, Ltd., Annapolis Junction, MD (US)

( * ) Notice: Subject to any disclaimer, the term of this patent is extended or adjusted under 35 U.S.C. 154(b) by 539 days.

(21) Appl. No.: 10/117,202

(22) Filed: Apr. 8, 2002

(51) Int. Cl.$^7$ .............................................. H04N 7/18
(52) U.S. Cl. ................................................... 348/148
(58) Field of Search .............................. 348/148, 149, 348/118, 151, 152; 340/902, 903

(56) References Cited

U.S. PATENT DOCUMENTS

| | | | | |
|---|---|---|---|---|
| 5,684,918 A | * | 11/1997 | Abecassis ..................... | 386/83 |
| 6,002,995 A | * | 12/1999 | Suzuki et al. ................ | 702/188 |
| 6,147,598 A | * | 11/2000 | Murphy et al. .......... | 340/426.19 |
| 6,411,874 B2 | * | 6/2002 | Morgan et al. ................ | 701/36 |
| 6,445,408 B1 | * | 9/2002 | Watkins ........................ | 348/148 |
| 6,477,150 B1 | * | 11/2002 | Maggenti et al. ............ | 370/312 |
| 6,529,233 B1 | * | 3/2003 | Allen ........................ | 348/211.2 |
| 6,559,769 B2 | * | 5/2003 | Anthony et al. ............. | 340/574 |
| 6,675,386 B1 | * | 1/2004 | Hendricks et al. ........... | 725/105 |
| 6,747,692 B2 | * | 6/2004 | Patel et al. ............... | 348/211.2 |

* cited by examiner

*Primary Examiner*—Chris Kelley
*Assistant Examiner*—Dave Czekaj
(74) *Attorney, Agent, or Firm*—Rosenberg, Klein & Lee

(57) ABSTRACT

A system integrated onboard a vehicular platform is provided for capturing video and/or audio data. The system (5) includes a plurality of video acquisition units (10) situated on the vehicular platform, at least one audio acquisition unit (20) operable to acquire an audio record within a predetermined region thereby, at least one removable data storage unit (40) for digitally storing the acquired video and audio records, a control unit (30) operably coupled to the video and audio acquisition units (10, 20) and to the removable data storage unit (40), a programmable user interface (50) coupled to the control unit by a local intercommunication link (60), and an intercommunications unit (70) operably coupled to the local intercommunication link (60). Each video acquisition unit (10) is operable to acquire a video record of at least one predetermined monitored area. The control unit (30) is programmably operable to control the video and audio acquisition units (10, 20), and to manage the storage of the acquired video and audio records into the storage unit (40). The user interface (50) includes a display device for displaying various information to the user. The intercommunications unit (70) serves to establish a wireless communications link with a remotely disposed vehicular platform.

19 Claims, 4 Drawing Sheets

INTEGRATED VIDEO DATA CAPTURE SYSTEM

BACKGROUND OF THE INVENTION

1. Field of the Invention

The subject integrated onboard video data capture system is generally directed to an onboard computer-controlled system for operation on a designated host vehicular platform. More specifically, the video data capture system is an onboard system which has in place the hardware and software components to capture both video and/or audio records of various events occurring in and around the given vehicular platform, efficiently store such records in digital form upon a removable medium, and establish reliable, noise-resistant communications links, both internal and external to the given system.

The need exists in various applications to comprehensively and reliably capture and save for later retrieval or transfer certain video and/or audio records of activity occurring in and about a given vehicular platform. One such application is found in law enforcement, wherein jurisdictions invariably dispatch fleets of vehicular platforms such as suitably equipped 'squad cars' or patrol 'cruisers.' Capturing timely video and/or audio records through such dispatched patrol vehicles could potentially yield a wealth of evidentiary material.

Accordingly, an increasing majority of jurisdictions are equipping their fleets of patrol vehicles with at least some video and/or audio acquisition capability. In more than a few jurisdictions, the acquisition systems installed in the patrol vehicles are somewhat comprehensive, including such components as camcorders, voice radios, video tape recorders, and portable computers (which may or may not be coupled to the other components). Any time the officer(s) assigned to a given patrol vehicle engages in a law enforcement activity like making a routine traffic stop, conducting a search or arrest, or engaging in a chase to apprehend a fleeing suspect, the video and/or audio acquisition units are operated to generate a real time objective indication of what actually transpired as events were unfolding. The acquired records are typically recorded on a magnetic tape medium and periodically removed for subsequent archiving or replay.

Among other things, such video and audio records have proven invaluable in identifying and prosecuting the actual perpetrators of unlawful acts. They have also proven helpful in exposing law enforcement officers' own misguided or negligent conduct. Such records, however, are only valuable to the extent that they are timely acquired, and saved with high fidelity and integrity. The challenges of meeting this criteria in practice are both significant and many. Often, the actuation of the appropriate video/audio acquisition equipment is not well enough automated to ensure that operation of the equipment occurs at the appropriate times. This leads all too often to a loss of recording opportunity or, conversely, to an undue consumption of record storage capacity by excessive extraneous recording at uneventful times.

It is no answer to rely primarily upon manual actuation of the equipment. Aside from being subject to normal human error, manual actuation requires at least some conscious effort. Yet, a human operator's primary focus invariably falls upon the events of interest that are actually transpiring. One cannot reasonably expect a human operator to have with any degree of consistency the presence of mind—or even the opportunity—to pause and carry out the system actuation steps when confronted with the events. This is especially so in the context of law enforcement, wherein the cost of even a momentary interruption of an officer's attention or hesitation in his/her responsive actions may very well jeopardize human life—many times, the officer's own.

Even with reliable and timely actuation, though, it is essential that the video and/or audio records be acquired in sufficiently comprehensive and clearly reproducible manner. One or more strategically situated acquisition units must be appropriately controlled, and the information acquired with a high degree of resolution, resistance to noise and interference, and other such properties to yield records which are later actually usable. Such components as a wireless radio or microphone employed for audio acquisition are typically quite vulnerable to noise and interference given the prevailing frequency bandwidth limitations and the crowded radio signal traffic within available frequency ranges. Moreover, the storage of acquired video/audio information onto a magnetic tape medium imposes highly restrictive capacity limitations, relieved only by either sacrificing the video/audio quality of the stored record or employing a tape having extraordinary length. Neither option is a readily practicable one.

In addition to the timeliness of actuation and preservation of reproducible fidelity, it is essential in law enforcement and other applications that the integrity of the acquired and stored records be carefully and continually maintained. The records must be guarded against both accidental corruption or erasure, as well as against intentional tampering.

These requirements present further practical difficulties, not the least of which is the need to adequately safeguard the records maintaining the ready removability from the vehicular platform of the storage medium. Practical difficulties also include the vulnerability of the stored records to later tampering by otherwise authorized personnel, as well as by unauthorized personnel. The threat of such tampering is unfortunately very real, especially in law enforcement applications. Those against whom the captured records would serve as culpatory evidence of misconduct would naturally possess the incentive to alter or eliminate the records. In some cases, those individuals may themselves be law enforcement officers whose improper, unauthorized actions may have been captured on video or audio. They may even be officers having the authority to later access and retrieve the stored video/audio records. While safeguards against unauthorized access to the storage tapes are known in the art (like physically disposing the storage tape(s) within an access-controlled lock box in the given vehicular platform) the tape may still be altered or erased notwithstanding the access control measures employed by one entrusted with authorized access.

These and other practical difficulties cannot be addressed by simply amassing within a given vehicular platform equipment known in the art to collect the set of necessary capabilities. Available space within a given vehicular platform suitable for the incorporation of such extraneous equipment is typically found to be at a premium. This is, again, particularly true in law enforcement applications. It is not uncommon for many law enforcement officers to spend most of their hours while on duty in and around their patrol cruisers. Indeed, the very nature of their primary duties requires law enforcement officers to spend as much of their on duty time as possible in the field, or patrolling a 'beat,' so they may engage in actual 'policing.' With the proliferation of utility equipment in the cabins of patrol cruisers, the cabins are popularly referred to as 'mobile offices,' and are increasingly utilized as such. As with any personal office, such 'mobile offices' fail to be less than fully effective when overly cluttered and complicated in the arrangement of various equipment and controls. Onboard video recording systems are known in the art.

2. Prior Art

Onboard video recording systems are known in the art. The best prior art known to Applicant includes U.S. Pat. No. 6,161,066; No. 5,926,210; No. 6,246,933; No. 5,007,050; No. 6,202,008; No. 4,949,186; No. 6,188,939; No. 5,491,464; No. 5,689,442; No. 5,781,437; No. 6,037,977; No. 6,037,991; No. 6,262,764; No. 5,978,017; No. 6,298,290; No. 4,843,463; No. 6,073,063; No. 5,848,367; No. 5,794,164; No. 5,767,788; and, No. 6,204,844.

There is no onboard computer-based system heretofore known, however, having the combination of features for comprehensively applying, efficiently storing, and reliably preserving and communicating video or audio records found in the subject integrated onboard video data capture system.

There is, therefore, a need for a system which acquires and stores video and/or audio records of certain law enforcement related activities occurring in and around a vehicular platform, and which operates simply yet efficiently and reliably. There is a need for such a system which provides timely actuation control over video and/or audio record acquisition and compact storage of such records in a form which permits high quality retrieval and reproduction, while safely preserving the stored records' integrity. There is, further, a need for such a system which provides the required capabilities without unduly cluttering and complicating the vehicular platform's cabin. There is, moreover, a need for a plurality of such systems capable of remotely communicating with one another so as to enable the exchange of video and/or audio records therebetween.

SUMMARY OF THE INVENTION

A primary object of the present invention is to provide a system which acquires and stores video and/or audio records occurring in and around a given vehicular platform.

Another object of the present invention is to provide a system which operates simply yet efficiently and reliably.

Yet another object of the present invention is to provide a system which actuates in timely manner control over video and/or audio record acquisition and compactly stores the acquired records in a form that permits high quality retrieval and reproduction.

It is still another object of the present invention to provide a system that safely preserves the stored records' integrity during and after system operation and use.

These and other objects are attained in the subject integrated onboard video data capture system formed in accordance with the present invention. The video data capture system is integrated in accordance with the present invention onboard a vehicular platform. The video data capture system generally comprises a plurality of video acquisition units situated on the vehicular platform; at least one audio acquisition unit operable to acquire an audio record within a predetermined region thereabout; at least one removable data storage unit for digitally storing therein the acquired video and audio records; a control unit operably coupled to the video and audio acquisition units and to the removable data storage unit; a programmable user interface coupled to the control unit by a local intercommunication link; and, an intercommunications unit operably coupled to the local intercommuncation link. The video acquisition units are each operable to acquire a video record of at least one predetermined monitored area. The control unit is programmably operable to control the video and audio acquisition units and to manage the storage of the acquired video and audio records in the storage unit. The user interface includes a display device for displaying various information to the user. The intercommunications unit serves to selectively establish a wireless communication link with a remotely disposed vehicular platform.

DETAILED DESCRIPTION OF THE PREFERRED EMBODIMENTS

Figure 1:
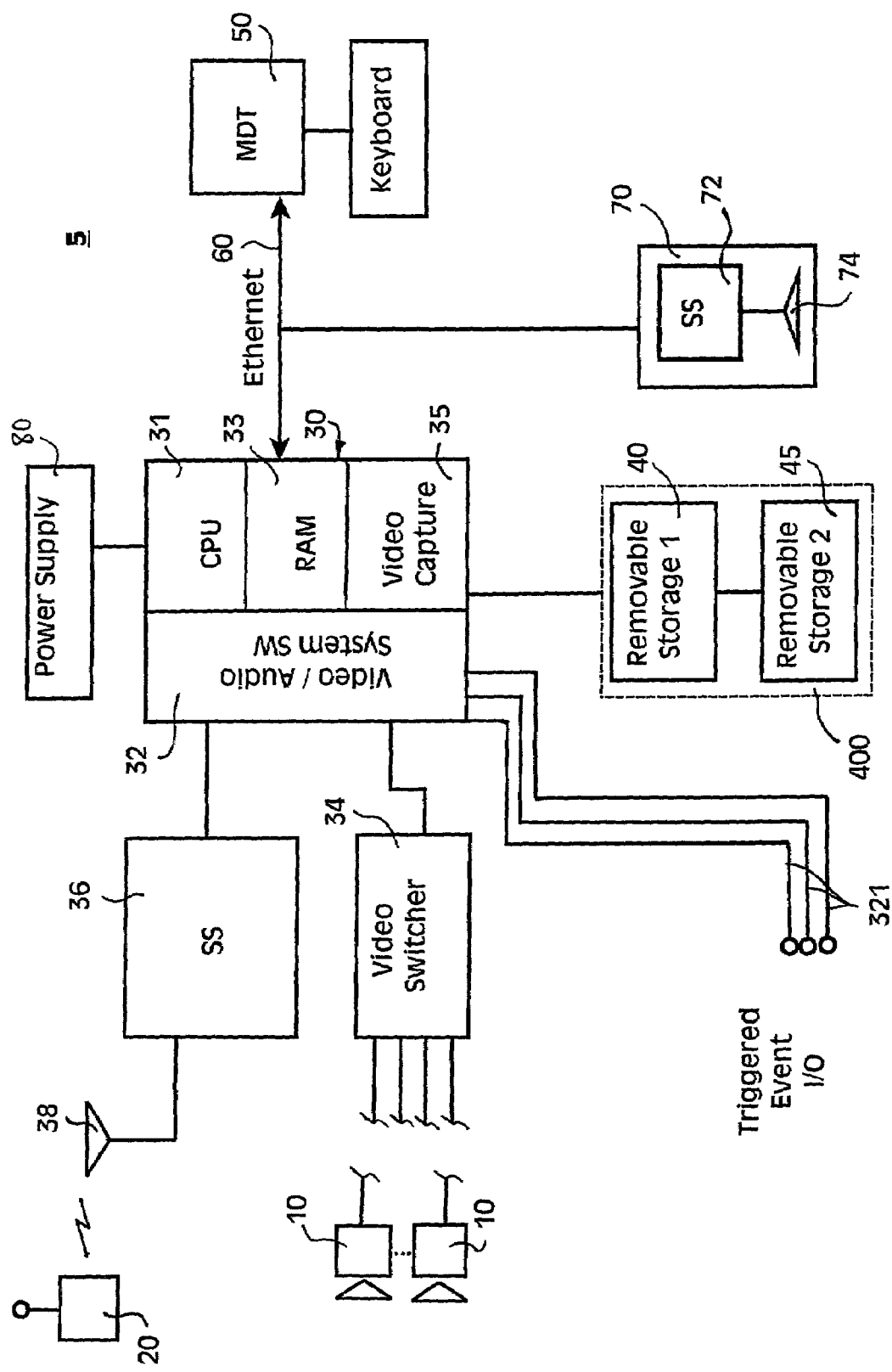
FIG. 1 is an illustrative schematic diagram of one embodiment of the present invention.

Referring now to FIG. 1, there is shown a schematic block diagram illustrating the interconnection of various components in accordance with one preferred embodiment of the present invention. As shown, the subject video data capture system 5 is integrated onboard a vehicular platform 1 (FIG. 4) which, depending on the particular application intended, may be one in a fleet of such vehicular platforms. In the embodiment shown, the vehicular platform belongs to a fleet of law enforcement vehicles of the type commonly referred to as patrol cruisers or squad cars. Other embodiments of video data capture system 5 may be readily integrated into vehicular platforms of various other types. Where the requirements of the application and available resources permit, video data capture system 5 may, for instance, be integrated onboard aircraft, surface vessels, motorcycles, and various other vehicles. For the purposes of brevity and clarity, however, the discussion herein is directed to the law enforcement application, as it presents a context for which the subject video data capture 5 and its combination of features are particularly well suited.

Video data capture system 5 generally comprises a plurality of video acquisition units 10 and one or more audio acquisition units 20, which may be of wired or wireless configuration, operationally coupled to a control unit 30. System 5 also comprises a first removable data storage unit 40 and a redundant second removable data storage unit 45 coupled to control unit 30. System 5 further comprises a programmable user interface unit 50 coupled to control unit 30 via a local intercommunication link 60, as well as an intercommunications unit 70 connected to that local intercommunication link 60. Preferably, local intercommunication link 60 includes a local area network link suitably established in accordance with the Ethernet standard known in the art. In other embodiments and applications, local intercommunication link 60 may include an RS 232 link or other such link of a type and form suitable for the given application. System 5 is powered by a regulated power supply 80 coupled to control unit 30.

Control unit 40 has programmably configured therein video/audio system software 32 which executes during use to provide the necessary interface and control for video and audio acquisition units 10, 20. Control unit 30 has accordingly coupled thereto a video switcher 34 and a spread spectrum interface unit 36. Video and acquisition units 10, 20 are configured as necessary to communicate with video switcher 34 and spread spectrum interface 36.

In overall concept, video acquisition units 10 are situated at strategic points on the vehicular platform 1 to monitor one or more predetermined areas in and/or about that vehicular platform 1. In the patrol cruiser application of the present embodiment, for instance, one video acquisition unit may be situated with its field of view directed outwardly forward the from vehicular platform 1; another may be situated with its field of view directed outwardly backward from platform 1; another may be situated with a field of view encompassing an area perhaps not covered by the other outwardly directed video acquisition units; yet another may be situated covertly within the vehicular platform's passenger cabin with its field of view covering the seat or compartment where a suspect may be detained onboard vehicular platform 1. Alternatively, one of the video acquisition units 10 may be situated with its field of view directed to the front operator's compartment in the vehicle's cabin so as to capture the activity of the law enforcement officer(s) or other operator of vehicular platform 1.

Video acquisition units are thus situated to maximize the video coverage of areas where activities of interest in the given application are most likely to occur. Certainly, the resulting areas of coverage may, depending on the particular requirements of the intended application, be adjusted, redefined, reduced in number, or supplemented with additional fields of view by, for example, panning an existing unit 10, or by introducing one or more additional video acquisition units 10.

Appropriate ones of the video acquisition units 10 employed are actuated and deactuated by video switcher 34 responsive to the video system control program(s) 32 executing on control unit 30. Preferably, such video system control programs 32 receive as inputs thereto one or more automatic triggering inputs 321 based on which actuation or deactuation of one or more corresponding video acquisition units 10 is automatically commanded by video system control programs 32. These automatic triggering inputs 321 are generated responsive to the occurrence of corresponding predefined triggering events. Each input 321 may be coupled to an output of an onboard sensing transducer (not shown), an output of the vehicular platform's onboard instrumentation, or the like to detect the occurrence of its correspondingly predefined triggering event. Examples of such triggering events within the patrol cruiser application of the present embodiment may be the actuation of that cruiser's emergency lights and/or siren; the cruiser's acceleration beyond a predetermined threshold vehicle speed; an individual's (typically a detained suspect) occupation of a certain compartment of the cruiser; or detection of excessive impact upon any portion of the cruiser. Actuation of audio acquisition unit 20 may likewise be automatically triggered responsive to the occurrence of these or other triggering events.

Video switcher 34 may be formed by any suitable switching device known in the art. The particular choice of configuration of the switching device(s) employed is not important to the invention, so long as it is compatible with the other system components employed, and is operable to effect the necessary switching with sufficient speed and reliability.

Each video acquisition unit 10 includes a camera device, either digital or analog in format, which when actuated transduces the video images within its field of view to electronic signal form transmitted to control unit 30 where it is appropriately processed and/or conditioned for video display and digital storage. Where the requirements of the intended application permit, video acquisition units 10 may include one or more wireless camera devices coupled via a suitably reliable communications link to video switcher 40.

Only one audio acquisition unit 20 is shown; however, a plurality of such audio acquisition units 20 may be employed for transducing to electronic form the audible speech and other sounds present at given times within predetermined regions in or about vehicular platform 1. In certain embodiments, one or more such audio acquisition units 20 may actually be integrated with the camera device of a video acquisition unit 10 (where, for instance, a camcorder device is employed). At least one audio acquisition unit 20, nonetheless, is preferably realized in wireless form. Such wireless audio acquisition unit 20 would be worn by or otherwise accompany a law enforcement officer assigned to the given patrol cruiser. Thus, when that officer leaves the cruiser in taking responsive action during an enforcement situation, the verbal exchanges or other pertinent sounds occurring about the officer will be accordingly recorded. If not already provided for within the devices employed for one or more video acquisition units 10, additional audio acquisition units 20 may be disposed onboard the cruiser 1 so as to pick up any voices or other sounds present at appropriate times within or immediately about that cruiser.

Wireless audio acquisition unit 20 may include any suitable audio transducing device known in the art. Preferably, such wireless audio acquisition unit 20 includes a device which transceives spread spectrum modulated signals in a manner compatible with spread spectrum interface 36 of patrol unit 30. Unlike the amplitude or frequency modulation techniques typically employed for wireless audio communication in law enforcement applications, the use of spread spectrum modulation techniques dramatically reduces the excessive noise and interference which commonly plague wireless transmissions—given the often dense electromagnetic traffic within the frequency bands shared by the cruisers of the given fleet, among others. The advantages inherent to this approach are particularly notable given that more than one cruiser often responds to a disturbance or other enforcement event. If not for the spread spectrum modulation, transmissions between respective wireless audio acquisition units 20 and control units 30 of those responding cruisers would likely jam or interfere mutually in competing for air time within shared frequency bands. Concurrent system operation would thus be precluded if not for the spread spectrum modulation which effectively immunizes each wireless link between a cruiser's audio acquisition unit 20 and control unit 30 from excessive levels of such ill effects. Both the clarity and security of the wirelessly transmitted audio is thereby preserved for recording at each cruiser's system 5.

Spread spectrum modulation techniques themselves are well known in the art. Generally, in those techniques pseudonoise codes or other sequential noise-like signal structures are used to 'spread' a normally narrowband information signal over a wider band of frequencies. When transmitted, a corresponding receiver correlates such spread signals to retrieve the original information signal. This approach permits multiple concurrent access by a plurality of users in a given area, increasing each established communication link's immunity to noise and interference.

Turning more closely to other portions of control unit 30, the unit includes a programmable computing platform having central processing unit, random access memory, and video capture components 31, 33, and 35. Each component 31, 33, 35 may be implemented using any devices known in the art suitable for the intended application. The particular specifications and configuration pertaining thereto will vary depending on the performance requirements and available resources of the application, as well as on the specifications and configuration of the other components used in the system. Video capture component 35 may be partially or wholly implemented in software depending, again, on the requirements of the intended application and on the specifications and configuration of the other components of system 5. Where the video acquisition equipment employed generates video signals in analog format, video capture component 35 preferably includes the necessary measures for converting such signals to a digital format prior to their storage in units 40, 45 or reproduction on a display monitor.

Control unit 30, preferably through its video capture component 35, applies predetermined processing or formatting to the acquired video record signals to maximize system efficiency and reliability. For instance, video capture component 35 applies a suitable compression scheme upon the video record signals to optimize the system's storage density. It preferably also applies to those video record signals suitable encryption to guard against unauthorized access. Among other things, such features make practicable the exchange of acquired video records between remotely disposed systems 5 without unduly diminished performance and without unduly compromised system security.

The acquired audio signals may also be compressed and encrypted if the intended application so necessitates. Control unit 30 is programmably configured in that event to effect the required compression and encryption. As with the video records, any suitable compression and encryption scheme known n the art may be employed.

As mentioned in preceding paragraphs, the video/audio system control software 32 executing on control unit 30 serves to actuate and control the video and audio acquisition carried out by system 5. Software 32 may be configured in any manner suitable for the intended application. Preferably, however, software 32 is as comprehensively configured as practicable, so as to minimize the need for manual intervention. While some form of manual actuation, adjustment, or overriding control is provided for by video/audio system control software, it preferably automates the setting of such parameters as exposure mode, image focus, gain control, and the like to their optimal levels or values. In addition to the automatic triggering inputs 321, software 32 may also receive manually generated inputs to effect such things as actuation switching, camera zooming, and volume control.

In accordance with the present invention, video data capture system 5 further includes at least one removable data storage unit 40 for digitally storing the acquired video and audio records. Removable data storage unit 40 is preferably formed with a cartridge structure of any suitable type known in the art in which a high capacity hard disc drive is securely housed. The cartridge is realized with a ruggedized construction capable of withstanding severe trauma, so as to protect the hard disc drive device disposed therein, even when extreme environmental conditions are encountered. In the present law enforcement patrol cruiser application, it is important that the packaging of removable data storage unit 40 be sufficiently rugged to withstand even deliberate attempts to destroy or otherwise tamper with it. To further heighten the survivability of the records-storing hard disc drive device, the entire cartridge unit is preferably disposed during normal use within a vault-like, armored lock box 400 or other secure compartment which provides access only to fully authorized individuals.

Preferably, lock box 400 is securely situated outside the passenger cabin of the patrol cruiser 1, within a trunk or other covered storage compartment. Within lock box 400 would be disposed one or more suitable docking or connecting bays electrically coupled to control unit 30. The hard disc drive-carrying cartridge of removable data storage unit 40 engages one bay effectively as a docking module.

For removable data storage unit 40, any suitable device type may be employed as the applicable requirements permit; however, in the embodiment illustrated, a compact 2.5 inch hard disc drive device is employed. Again, the hard disc drive device is encased within a cartridge with suitable shock resistance and other protective measures for withstanding severe impact and other environmental extremes.

Figure 2:
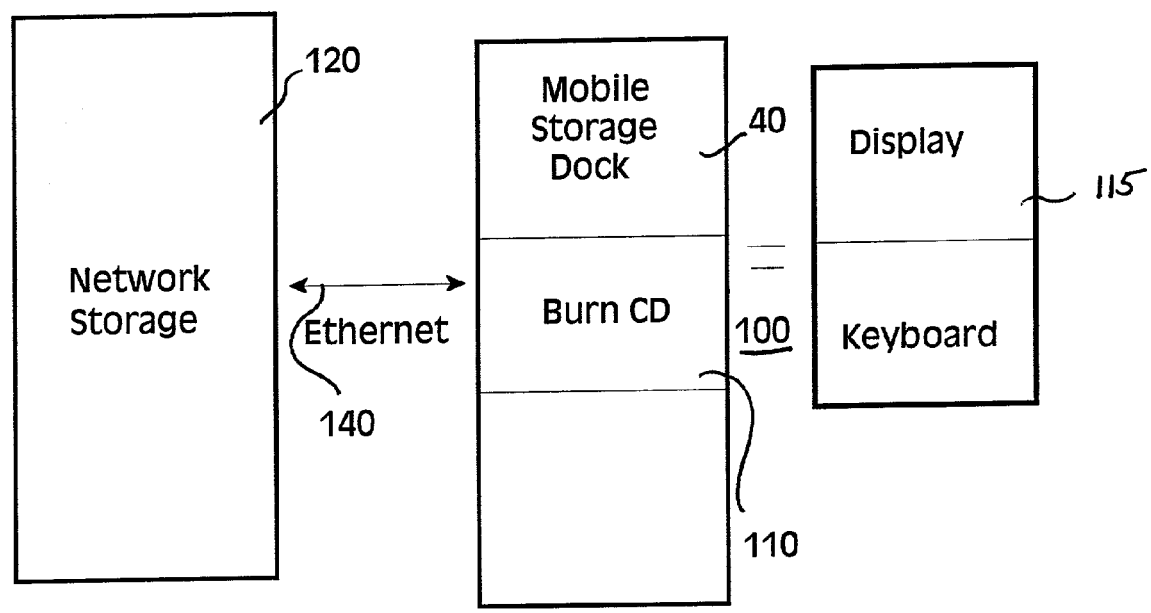
FIG. 2 is an illustrative schematic diagram showing an exemplary workstation arrangement for retrieving records captured in accordance with the present invention.

The hard disc drive's required disc storage depends, obviously, on a number of different factors, including the compression ratio of the compression scheme employed, if any, and the expected period between successive erasures following downloads of data therefrom to a more permanent storage medium. With the present state of digital technology, a 30 gigabyte hard drive capacity is sufficient to store on the order of approximately eight hours of recorded data. During changes in personnel shifts (each of which typically lasts eight hours), then, the hard disc drive-carrying cartridge of removable data storage unit 40 may be decoupled from its docking bay, removed from lock box 400, and docked at a central workstation's docking unit for data retrieval (FIG. 2). Of course, this is preferably performed by a captain, supervisor, or other shift manager having both the authority and means to access lock box 400, then the actual data stored on the hard disc drive. Suitable hardware and software means known in the art are employed to ensure that the necessary degree of verification occurs to check access to the data.

Preferably, an automatically updatable access log is persistently maintained on the hard disc drive device. It is maintained in a hidden file format so that once the stored data is in any way accessed, such access is immediately documented in that access log. Not even the accessing individual, despite his or her access authority, is permitted the capability to alter the access log. This automatically updated access log serves thereby as a permanent record of each and every access made of the hard disc drive throughout its entire service life. Preferably, the access log would include for each access entry such information as the identity of the accessing individual, the accessing individual's rank, the date and time of access, the nature of the access (erase, read, copy, . . . ), the identification of the particular patrol cruiser on which the hard disc drive device was last utilized, and the identification of the facility at which access was made.

The software for executing such maintenance and update of the access log preferably resides in executable form on the hard disc drive of removable data storage unit 40. Suitable interfacing software preferably resides at both control unit 30 and the central workstation at which the hardware disc drive-carrying cartridge is to be docked for access.

Referring to FIG. 2, the interaction of components at a central or control facility is schematically illustrated. In practice, such a facility may in the present embodiment be a station house, precinct, or other location at which the given fleet of cruisers 1 are headquartered or from which they are dispatched. The facility would house a workstation 100 through which an authorized individual would access the records stored on a removed data storage unit 40. Workstation 100 preferably includes at least one docking station to which a data storage unit 40 removed from the lock box 400 and bay of a given cruiser 1 may be temporarily docked.

Workstation 100 also includes equipment 110 for writing, or 'burning' data onto an optically readable data storage medium, such as a CD or DVD ROM. Workstation 100 further includes a user interface 115 preferably having at least a display monitor and keyboard through which the authorized individual may enter his/her identification code, password, and other such verification information to gain access to the records stored on removed data storage unit 40. Workstation 100 is connected by a local area network link 140, such as an Ethernet link, to a network storage device or facility 120. Network storage 120 may, depending on its available storage and the requirements of the intended application, store for long term retention all or part of the data resulting from access of data storage unit 40. Network storage 120 also maintains a hidden file which preferably records each and every access of a removed data storage unit 40 at workstation 100. Each entry in this history of accesses also includes such information as the identity of the accessing individual, the date and time of access, the nature of the access (erase, read, copy, . . . ), the identification of the particular data storage unit and/or patrol cruiser corresponding to the access, and the identification of the workstation 100 and/or facility at which the access was made.

Figure 3:
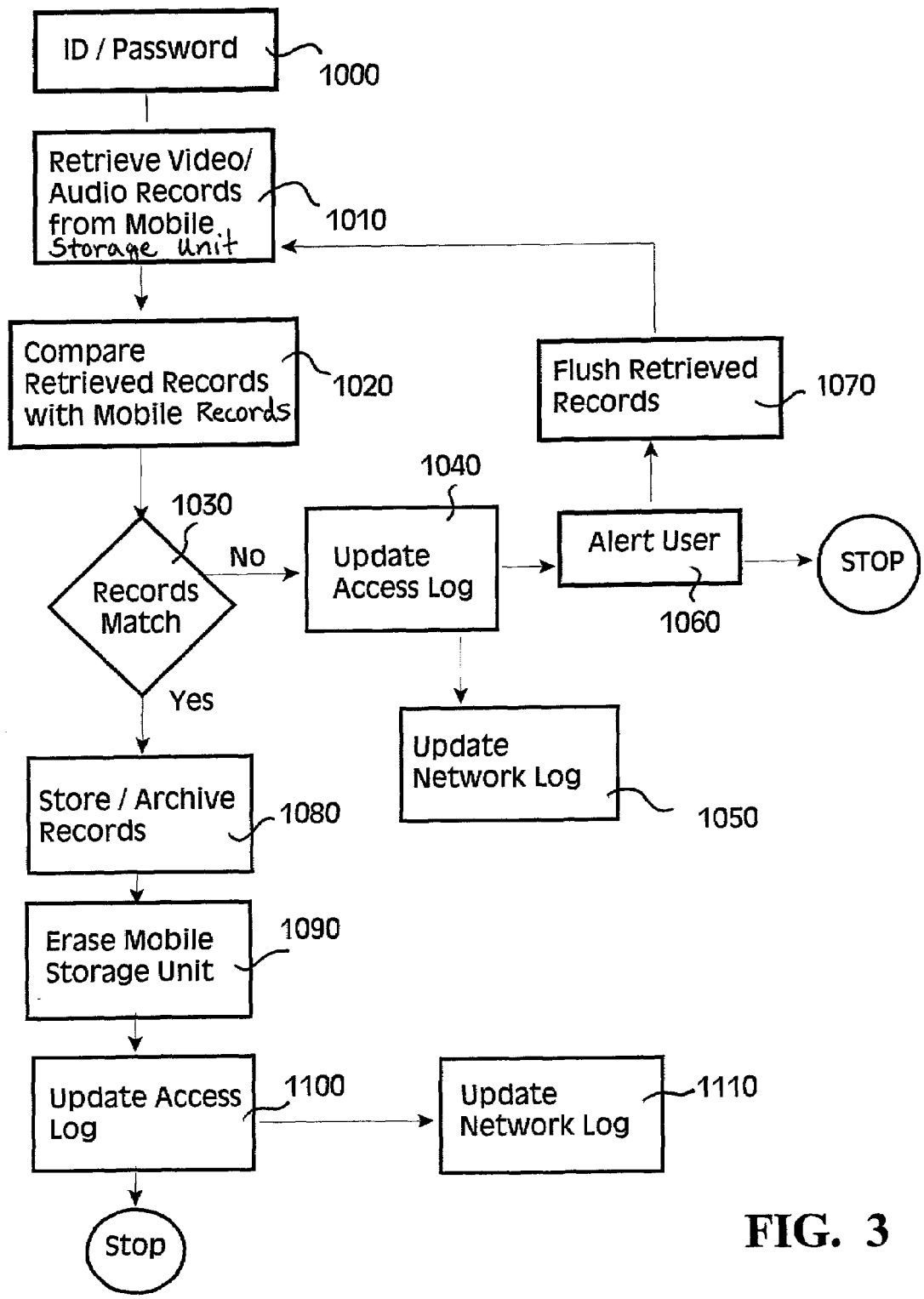
FIG. 3 is a functional flow diagram illustrating an exemplary flow of steps for accessing and archiving records captured in accordance with the present invention; and, FIG. 4 is a schematic diagram illustrating a plurality of systems utilized in accordance with one embodiment of the present invention.

FIG. 3 illustrates the functional steps carried out during access of a removed data storage unit 40. Once the accessing individual docks a mobile data storage unit 40, he/she loads the appropriate optical storage medium, and enters his/her ID code and password, workstation 100 operates first to verify the entered ID code and password, as indicated at block 1000. At block 1010, workstation 100 retrieves from mobile data storage unit 40 the acquired video/audio records. The operational flow then proceeds to block 1020 at which point the retrieved records are compared with the acquired records still residing on mobile data storage unit 40. If the compared records do not completely match, the flow conditionally proceeds, as indicated at block 1030, to blocks 1040 and 1050 at which the access log maintained on mobile data storage unit 40 and the history maintained at network storage unit 30 are accordingly updated. The flow thereafter proceeds to block 1060 where the accessing individual is appropriately alerted of the failed file check. If the individual so prompts, the retrieved records are flushed from memory at block 1070, and the flow is returned to block 1010 for a subsequent attempt at uncorrupted retrieval of the acquired records.

Where at block 1030, the retrieved records are found to correlate completely with those still stored in mobile data storage unit 40, the flow proceeds to block 1080 where the required storing or archiving of records is effected. The extent to which the retrieved records are stored or archived on the optical storage medium loaded in writing device 110 and/or network storage 120 is determined by the specific requirements of the intended application. The accessing individual may be granted a degree of control over the extent of such storage or archiving, depending again on what the requirements of the intended application afford.

The flow proceeds from block 1080 to block 1090 where the docked mobile data storage unit 40 is refreshed for re-use by purging the records earlier stored thereon. The flow next proceeds to blocks 1100 and 1110 where the access log maintained on mobile data storage unit 40 and the access history log maintained on network storage 120 are appropriately updated.

Referring back to FIG. 1, an additional removable data storage unit 45 is preferably also coupled to control unit 30 for the redundant storage of the acquired video/audio data records. Preferably, this additional data storage unit 45 is situated with the first data storage unit 40 within the cruiser's lock box 400, then received in its own bay. The additional data storage unit 40 serves a contemporaneous archiving function, redundantly storing the video/audio records as they are stored upon removable data storage unit 40. As such, auxiliary data storage unit 45 preferably includes a device for writing data onto an optically readable storage medium, such as a CD/DVD ROM burner. Auxiliary data storage unit 45 also includes, preferably, one or more CD/DVD ROM devices loaded into the burner having sufficient capacity to store the video/audio records acquired during a patrol shift or some other predefined period of operation. In other embodiments and applications where the requirements so permit, storage unit 45 may be one which utilizes for data storage other suitable storage mediums such as magnetic disc/tape, solid-state electronic, or the like. In any event, upon completion of the shift, the CD or DVD ROM storage device may be removed, appropriately labeled, and immediately archived for later access. This may obviate the need to perform extensive archiving downloads at workstation 100.

Programmable user interface unit 50 preferably includes a portable 'notebook' or 'laptop' computer, or any other computing platform that serves as a mobile data terminal. Unit 50 is programmably configured to execute any application and interface control software required by the intended application.

User interface unit 50 is connected as shown at least to control unit 30 via a local intercommunication link 60. As mentioned in preceding paragraphs, this link is preferably configured as a local area network link in accordance with the Ethernet standard known in the art which affords a number of benefits—both structural and operational—to the subject video data capture system 5. One notable benefit is that it enables the user control measures for various switches and parametric settings/adjustments to be conveniently centralized at user interface unit 50. For instance, video and/or audio record On/Off switching, audio volume control, auxiliary system component activation/deactivation, remote intercommunication initiation and other such user control measures may be implemented either as touch screen or pointer-selected menu options graphically displayed on the mobile data terminal of interface unit 50.

This would obviate extraneous control boxes for the various equipment integrated as components of system 5, yielding not only a savings in terms of monetary costs, but also in terms of cabin and payload/storage space consumption—space which tends in most cases to be quite scarce, particularly in the case of law enforcement patrol cruisers or squad cars. Hence, the 'mobile office' environment developed within a cruiser 1 may be kept less cluttered, and therefore less obstructive to the occupant. This carries very real safety implications for the occupant who often finds him-/herself scurrying to perform his or her duties in the most exigent of circumstances.

Figure 4:
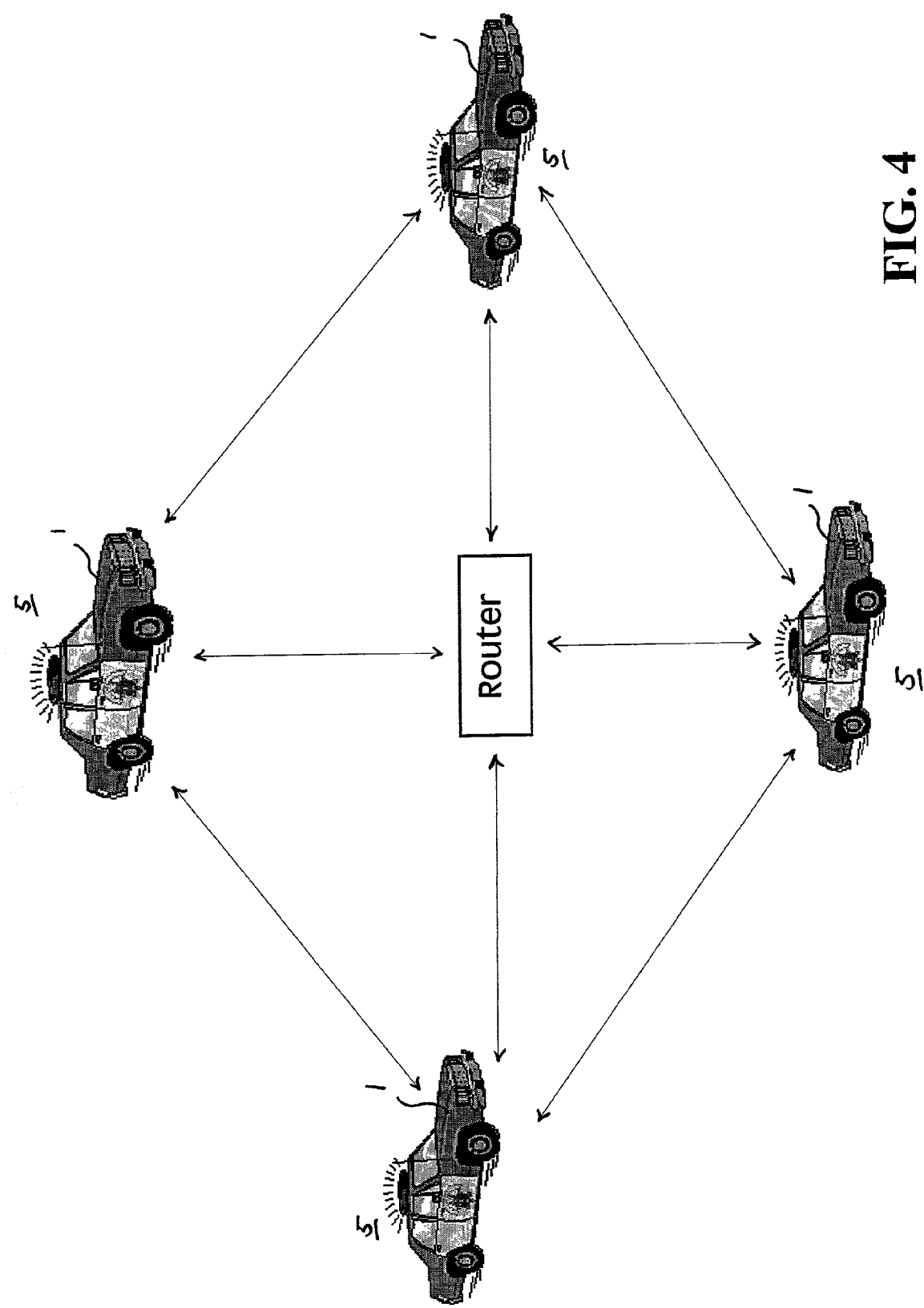

Intercommunications unit 70 is also connected to local area network link 60. Intercommunications unit 70 serves to enable bidirectional communication and exchange of mutually acquired video/audio records between video data capture systems 5 respectively integrated onboard remotely disposed cruisers 1. In accordance with the present invention, such intercommunication may be selectively established in wireless manner between remotely situated cruisers 1 of a given fleet, as illustrated in FIG. 4. With the intercommunication link established therebetween, an operator at one linked cruiser may generate at his or her own user interface unit 50 at least a video record captured by one or more video acquisition units 10 of a linked remote cruiser's system 5. To the extent permitted by the given application, the operator may also exercise a certain degree of control over the remote cruiser's system 5 operation by effecting transmission of the necessary system control signals to interface unit 50 and/or control unit 30 of the remote cruiser's system 5. The local operator may, for example, select between the various views provided by the remote system's video data acquisition units 10. Preferably, he/she may also zoom a particular camera in or out, actuate and deactuated recordation, and adjust image quality. This permits the local operator to view, record, and, if necessary, hear any activity of interest in and around the remote cruiser from a safe distance.

It is not uncommon in law enforcement for a cruiser 1 first responding to a situation to remain unmanned for an extended period of time. The cruiser's assigned officer(s) may simply have vacated the cruiser to investigate or may, unfortunately, have been incapacitated, such that adequate communication with the officer(s) cannot be established. An officer in a cruiser responding as backup may then establish a communications link with the first cruiser's system 5 via his/her intercommunications unit 70, enter the necessary verification information (such as identification code and password), and thereby assume full or partial control over the first cruiser's system 5. The officer may then actuate that cruiser's video/audio data acquisition unit equipment to cautiously survey the scene and determine the best course of action before too closely approaching.

Intercommunications unit 70 includes a land interface device 72 and a transceiving antenna device 74 coupled thereto. Land interface device 72 operates to apply and decode spread spectrum modulation to the information transmitted and received via antenna device 74. Again, using a spread spectrum modulation technique permits multiple concurrent access to the available transmit frequency bands without encountering undue noise and interference. Land interface device 72 thus includes, preferably, at least one appropriately configured spread spectrum modulator/demodulator. Antenna device 74 preferably includes at least one suitably tuned antenna mounted, for example, upon the trunk of the given cruiser 1 for optimum range.

Intercommunications between systems 5 of remotely situated cruisers 1 may be established directly therebetween. Where necessary, though, a centrally disposed communications router facilitates the link between appropriate cruisers 1 in the given fleet. The communications router is preferably configured to permit an operator and one cruiser 1 to 'log' into and fully access system 5 of the other cruiser 1 linked thereto when his or her own cruiser 1 comes within 1,800 feet, or some other predefined range of that other cruiser 1.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular combinations of system control or system operational flow steps may be reversed or interposed, all without departing from the spirit or scope of the invention as defined in the appended claims.

What is claimed is:

1. A video data capture system integrated onboard a vehicular platform comprising:

(a) a plurality of video acquisition units for the vehicular platform, each said video acquisition unit being operable to acquire a video record of at least one predetermined monitored area;

(b) at least one audio acquisition unit operable to acquire an audio record within a predetermined region thereabout;

(c) at least one removable data storage unit for digitally storing therein said video and audio records;

(d) a control unit operably coupled to said video and audio acquisition units and to said removable data storage unit, said control unit being programmably operable to control said video and audio acquisition units and managing said storage of said video and audio records in said storage unit;

(e) a programmable user interface unit coupled to said control unit by a local intercommunication link, said user interface unit including a display device; and, (f) an intercommunications unit operably coupled to said local intercommunication link operable to selectively establish a wireless communication link with a remotely disposed vehicular platform;

wherein said removable data storage unit includes an outer docking cartridge and an erasable storage device operably housed therein;

wherein said removable data storage unit is configured in access restricted manner, said removable storage unit maintaining an access log cumulatively updated with corresponding access information responsive to each attempted read or erase access thereof.

2. The video data capture system as recited in claim 1 wherein said local intercommunication link includes a local area network link.

3. The video data capture system as recited in claim 2 wherein said local area network link is an Ethernet link.

4. The video data capture system as recited in claim 1 wherein said intercommunications unit includes a spread spectrum interface device for selectively transceiving audio and video information in spread spectrum modulated form.

5. The video data capture system as recited in claim 1 wherein at least one said audio acquisition unit includes a wireless spread spectrum transceiver for transceiving audio information to and from said control unit in spread spectrum modulated form.

6. The video data capture system as recited in claim 1 wherein said control unit includes a video switcher for automatically actuating said video acquisition units in selective manner responsive to at least one of a plurality of predetermined triggering inputs, said predetermined triggering inputs including a vehicular event-sensing signal.

7. The video data capture system as recited in claim 1 further comprising a redundant removable data storage unit for digitally archiving said video and audio records therein in substantially contemporaneous manner.

8. The video data capture system as recited in claim 1 wherein said removable data storage unit maintains data in a compressed configuration corresponding to a predetermined compression scheme.

9. The video data capture system as recited in claim 1 wherein said user interface unit includes a mobile data terminal operable to display a programmably configured graphic user interface display, a pointing device, and a control processor coupled thereto.

10. The video data capture system as recited in claim 1 wherein at least one of said video acquisition units is a digital camcorder device, and at least one of said video acquisition units is covertly disposed.

11. A video data capture system integrated onboard a vehicular platform comprising:
 (a) a plurality of video acquisition units for the vehicular platform, each said video acquisition unit being operable to acquire a video record of at least one predetermined monitored area;
 (b) at least one wireless audio acquisition unit operable to acquire an audio record within a predetermined region thereabout;
 (c) at least first and second data storage units for digitally storing therein said video and audio records, said first data storage unit being removable, said second data storage unit being operable to digitally archive in substantially contemporaneous manner said video and audio records stored in said first data storage unit;
 (d) a control unit operably coupled to said video and audio acquisition units and to said first and second data storage units, said control unit being programmably operable to control said video and audio acquisition units and managing said storage of said video and audio records in said first and second data storage units, said control unit being operable to maintain a spread spectrum modulated wireless link with said audio acquisition unit, said control unit including a video switcher for automatically actuating said video acquisition units in selective manner responsive to at least one of a plurality of predetermined triggering inputs, said predetermined triggering inputs including a vehicular event-sensing signal;
 (e) a programmable user interface unit coupled to said control unit by an Ethernet local area network link said user interface unit including a display device; and,
 (f) an intercommunications unit operably coupled to said local area network link, said intercommunications unit being operable to selectively establish a spread spectrum modulated wireless communication link with a remotely disposed vehicular platform;
 wherein said removable data storage unit includes an outer docking cartridge and an erasable storage device operably housed therein;
 wherein said removable first data storage unit is configured in access restricted manner, said removable data storage unit maintaining an access log cumulatively updated with corresponding access information responsive to each attempted read or erase access thereof.

12. The video data capture system as recited in claim 11 wherein said removable first data storage unit maintains data in a compressed configuration corresponding to a predetermined compression scheme.

13. The video data capture system as recited in claim 11 wherein said user interface unit includes a mobile data terminal operable to display a programmably configured graphic user interface display, a pointing device, and a control processor coupled thereto.

14. The video data capture system as recited in claim 11 wherein at least one of said video acquisition units is a digital camcorder device, and at least one of said video acquisition units is covertly disposed.

15. A distributed video data capture system comprising:
 (a) a fleet of vehicular platforms; and,
 (b) a plurality of video data capture subsystems respectively integrated onboard said vehicular platforms, each said video data capture subsystem defining a local area network within said vehicular platform thereof, said video data capture subsystems being linkable one with the others for reversible transmission of video and audio data therebetween, each said video data capture subsystem including:
  (1) a plurality of video acquisition units coupled to said vehicular platform thereof, each said video acquisition unit being operable to acquire a video record of at least one predetermined monitored area;
  (2) at least one wireless audio acquisition unit operable to acquire an audio record within a predetermined region thereabout;
  (3) at least first and second data storage units for digitally storing therein said video and audio records, said first data storage unit being removable and including a hard disc drive device, said second data storage unit being operable to digitally archive in substantially contemporaneous manner said video and audio records stored in said first removable data storage unit, said second removable data storage unit including an optically readable disc device;
  (4) a control unit operably coupled to said video and audio acquisition units and to said first and second data storage units, said control unit being programmably operable to control said video and audio acquisition units and managing said storage of said video and audio records in said first and second data storage units, said control unit being operable to maintain a spread spectrum modulated wireless link with said audio acquisition unit, said control unit including a video switcher for automatically actuating said video acquisition units in selective manner responsive to at least one of a plurality of predetermined triggering inputs, said predetermined triggering inputs including a vehicular event-sensing signal;
  (5) a programmable user interface unit coupled to said control unit by a local area network link, said user interface unit including a display device; and,
  (6) an intercommunications unit operably coupled to said local area network link, said intercommunications unit being operable to selectively establish a spread spectrum modulated wireless communication link with said video data capture subsystem of a remotely disposed one of said vehicular platforms;
 wherein said removable first data storage unit is configured in access restricted manner, said removable data storage unit maintaining an access log cumulatively updated with corresponding access information responsive to each attempted read or erase access thereof.

16. The distributed video data capture system as recited in claim 15 further comprising a central station remotely disposed from said vehicular platforms, said central station including a router subsystem for selectively interlinking a plurality of said video data capture subsystems responsive to at least one of said video data capture subsystems.

17. The distributed video data capture system as recited in claim 15 wherein said control unit of a first of said video data capture subsystems is controllably accessible to said user interface unit of a second of said video data capture subsystems interlinked therewith.

18. The video data capture system as recited in claim 17 wherein said local area network link is an Ethernet link.

19. The video data capture system as recited in claim 15 wherein said removable first data storage unit maintains data in a compressed configuration corresponding to a predetermined compression scheme.

* * * * *